March 1, 1938. A. O. SCHAEFER 2,109,625
SAW BLADE ATTACHMENT
Filed Aug. 15, 1936
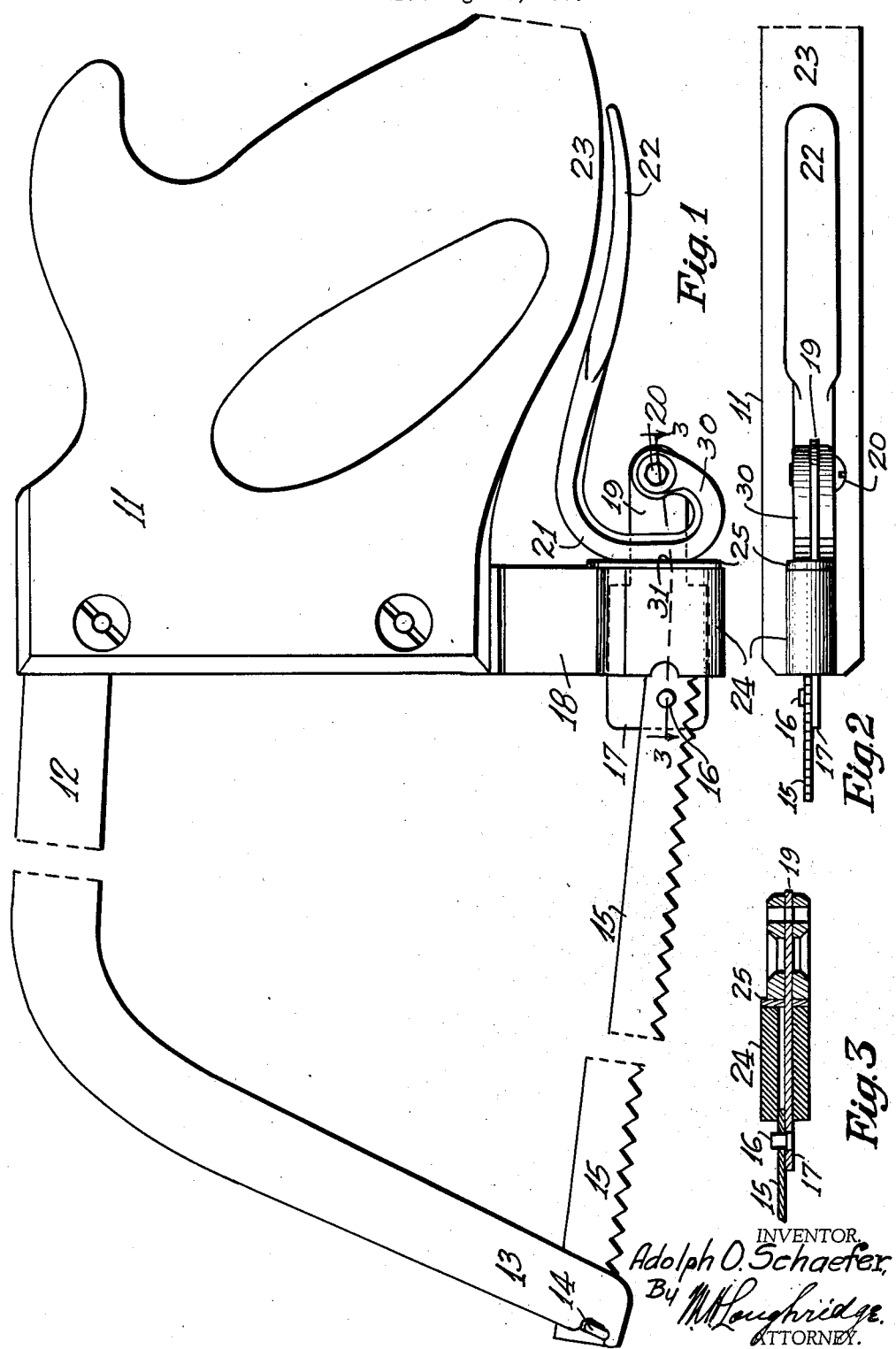
INVENTOR.
Adolph O. Schaefer,
By M. M. Loughridge
ATTORNEY.

Patented Mar. 1, 1938

2,109,625

UNITED STATES PATENT OFFICE 2,109,625

SAW BLADE ATTACHMENT

Adolph O. Schaefer, Brooklyn, N. Y., assignor to Atlantic Service Company, Inc., Brooklyn, N. Y., a corporation of New York Application August 15, 1936, Serial No. 96,303

2 Claims. (Cl. 145—33)

This invention relates to a means for securing a saw blade to a hack saw frame and it has for an object to provide a resilient cam for applying tension to the blade; another object of the invention is to provide a shock absorber for hack saw blades which are held in tension by the saw frame, and another object of the invention is to provide a cam for applying tension to the blade in the form of a spiral with the end of the spiral extended to form a lever by which the cam is operated. Other objects of the invention will be more particularly understood from the following specification and the accompanying drawing, in which:

Fig. 1 is a side view of a saw frame with a handle and a saw blade secured thereto by means of this invention;

Fig. 2 is a partial bottom view corresponding to Fig. 1; and

Fig. 3 is a section on line 3—3 of Fig. 1.

This invention is illustrated in connection with the attachment of a saw blade to a saw frame of the hack saw type, such as disclosed in the meat saw in U. S. Patent 1,972,566 of September 4, 1934. The usual construction in these saws is to provide a flat bar frame having the ends turned substantially parallel to each other and provided with the usual saw handle. The saw blade is pivotally secured to a stud at the outer end of the frame and the opposite end of the blade by a perforation is secured to a stud or pin on a member which slides in the opposite end of the frame. Means are provided for applying tension to this sliding member whereby the saw blade is by the tension of the frame maintained taut and in position for use. In the better type of saw a cam is used for applying tension to the sliding member, as illustrated in the above patent, whereby the blade may be quickly released from the frame and replaced by another blade.

In the former construction the tension on the blade has been obtained from the resistance of the frame which is made in the form of a flat bar and is comparatively rigid. The purpose of the present invention is to provide a resilient cam independent of the tension of the saw frame which has a limited movement but greater flexibility than the saw frame itself so that it absorbs minor jars effecting the movement of the saw blade thereby making the sawing operation easier and increasing the life of the saw blade. The resilient cam is obtained by a spiral shaped member which is pivotally attached to a sliding member and has its free end extended to form an operating lever for the cam which folds against the handle when in the operating position. The cam spring and lever are formed in a single piece.

In the drawing, 11 is the saw handle which is secured to the frame 12, having its outer end bent forward as indicated at 13 and to which the blade 15 is pivotally secured by the stud 14. The opposite end of blade 15 is pivotally secured by a perforation in the blade engaging stud 16, mounted in the sliding plate or member 17, sliding in a rectangular slot in the end 24 of the frame 18. The sliding plate 17 is extended at 19 where it is pivotally connected at 20 with the cam 21 which engages the washer 25 at 31. The cam 21 is formed in a spiral at 30 and has its free end extended at 22 by which the cam is rotated on the pivot 20. When in the tensioning position the end 22 of cam 21 folds against the handle 11 at 23, so that it is out of the way and can readily be brought into use. The spiral part of the cam at 30 is slotted to receive the member 19 as indicated in Fig. 2.

In this construction it will be noted that the ends 13 and 18 of the frame 12 are substantially parallel to each other and the saw blade 15 is held in tension between these ends. The saw blade is held in alignment and in tension with the sliding plate 17 and this plate through pivot 20 engages the inner end of the spiral cam 21 which has a flat side to seat at 31 when under tension. When the lever 22 which is substantially at right angles to the flat side of the cam, has moved away from the handle the cam is released and the blade may be removed. The cam 21 is made of spring stock and applies a yielding tension to the blade when it is in use, which is more resilient than the tension of the members 13 and 18 of the saw frame.

Having thus described my invention, I claim:

1. A hack saw comprising a resilient frame having spaced, substantially parallel ends integral with the back, a handle secured to one of said ends with a portion of the frame extending beyond the handle and having a slot therein, a sliding member in said slot, a saw blade secured to said sliding member and to the opposite end of the frame, a slotted cam formed in a resilient spiral, said sliding member being located in the slotted cam and pivotally connected to the end of the spiral, said spiral cam having a flat portion opposite the pivot engaging the extending portion of the frame and having its end extending substantially at right angles to said flat portion to lie against the handle and to form a lever for operating the cam.

2. A hack saw comprising a resilient frame having, spaced, substantially parallel ends integral with the back, a handle secured to one end of the frame, a slot in one of said ends, a member sliding in said slot, a saw blade pivotally secured to said sliding member by a perforation fitting a pin in the member and pivotally secured to the opposite end of the frame and held in position by the tension of the frame, a slotted cam formed in a resilient spiral, said sliding member being located in said slotted cam and pivotally connected to the end of the spiral cam, said cam having a flat portion opposite the pivot engaging the end of the frame and having its end extended to form a lever for operating the cam.

ADOLPH O. SCHAEFER.